No. 879,757. PATENTED FEB. 18, 1908
H. FORD.
PISTON RING.
APPLICATION FILED JULY 16, 1906.
*Fig. 1*
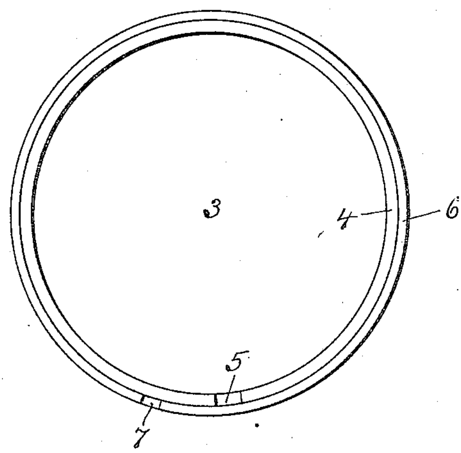
*Fig. 2*
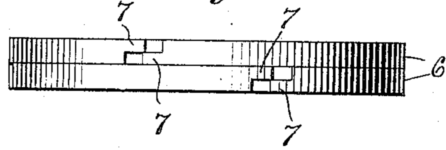
*Fig. 3*
5 5 4
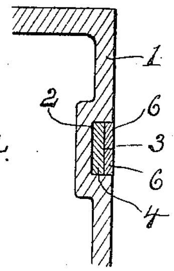
*Fig. 4.*
WITNESSES:
Chas. B. Shumway
Gordon C Burnett
Henry Ford
INVENTOR.
BY [signature]
ATTORNEYS

UNITED STATES PATENT OFFICE.

HENRY FORD, OF DETROIT, MICHIGAN.

PISTON-RING.

No. 879,757. Specification of Letters Patent. Patented Feb. 18, 1908.

Application filed July 16, 1906. Serial No. 326,481.

*To all whom it may concern:*

Be it known that I, HENRY FORD, a citizen of the United States of America, residing at Detroit, in the county of Wayne and State of Michigan, have invented certain new and useful Improvements in Piston-Rings, of which the following is a specification, reference being had therein to the accompanying drawings.

This invention relates to improvements in packing rings for pistons, the object of the invention being to provide a packing ring which is especially adapted for use in internal combustion engines where there is a high compression and extreme heat, the same being so constructed as to effectually prevent leakage of the gases past the piston and prevent sticking or binding.

To this end the invention consists in forming each ring of a plurality of rings fitted together and so arranged as to give the necessary resiliency to prevent binding and at the same time will present the necessary surface to the cylinder with sufficient pressure to effectually prevent leakage. And the invention further consists in the particular construction, arrangement and combination of parts, all as hereinafter more fully described, reference being had to the accompanying drawing, in which Figure 1, is a plan view of a packing ring embodying the invention; Fig. 2, a side elevation of the same; Fig. 3, a side elevation of the inner ring; and Fig. 4, a sectional view of a portion of a piston with the rings in place.

1 represents a piston of the ordinary construction having a circumferential groove 2 to receive the packing ring 3 which consists of an inner split or divided ring 4 of a width to fit in the groove and having its abutting end 5 beveled or cut at an inclination to its edges to fit together. This inner ring is of less thickness than the depth of the groove and lying upon it within the groove are the two outer split or divided rings 6 which together are equal in width to the width of the inner ring and are of lesser thickness, being just sufficiently thick to fill the groove. The abutting ends of these outer rings are oppositely notched to form a projecting tongue 7 on each to fit within the notch in the opposite end and thus in a manner interlock or lap past each other and they are so placed in the groove in relation to each other and to the inner ring as to break joints.

The rings are all formed so that they have a tendency to spring open, as shown in Figs. 1, 2 and 3 and when forced into a cylinder they yieldingly push outward against its inner surface.

The packing being formed of several rings yields more readily than a single ring having the same contact surface, the inner heavy ring forming a spring backing for the outer light rings to hold them in contact with the cylinder with sufficient force to prevent any leakage and at the same time permitting them to yield sufficiently to prevent too great friction and wear. The use of two rings which are set so as to break joints also prevents leakage past the piston and these rings may be more readily removed when broken and worn than a single heavy one and are less expensive to replace.

Having thus fully described my invention, what I claim is:

1. A packing ring comprising an inner ring having oblique overlapping ends and a pair of outer facing rings seated side by side on the inner ring each having their ends halved and gained together, said ends being staggered in relation to each other and to the inner ring ends.

2. A packing ring comprising a comparatively wide inner ring of spring metal severed on a line oblique to the margins, forming overlapping ends with oblique faces, and a pair of facing rings of spring metal together covering the inner ring, each having ends halved and gained together, the joints of said rings being in staggered relation.

3. A packing ring comprising a comparatively heavy inner expansible ring of spring metal adapted to completely fill the bottom of the conventional retaining groove of an engine piston, severed on a line oblique to the margin, forming overlapping ends with oblique faces, and a pair of lighter facing rings of spring metal encircling the inner ring and filling the groove, each of the outer rings being severed and halved together to form tenons permanently overlapping each other and closing in corresponding rabbets, the faces and sides of the tenons forming right angled shoulders and the rings being assembled with their joints in staggered relation.

4. A packing ring consisting of an inner heavy ring of spring metal severed at one side at an inclination to its edge to form overlapping ends, two outer rings of spring metal of lesser thickness than the inner ring on the outer surface of said inner ring yieldingly opposing the expansion of the inner ring and forming the surface for the packing, said outer rings together equaling in width the width of the inner ring, each being severed at one side and its severed ends notched to form overlapping tongues adapted to engage corresponding rabbets, and all of said rings being so placed relative to each other as to break joints.

In testimony whereof I affix my signature in presence of two witnesses.

HENRY FORD.

Witnesses:

OTTO F. BARTHEL,

ADOLPH BARTHEL.